US011580495B2

(12) United States Patent
High et al.

(10) Patent No.: US 11,580,495 B2
(45) Date of Patent: Feb. 14, 2023

(54) SYSTEMS AND METHODS FOR AUTOMATED ASSOCIATION OF PRODUCT INFORMATION WITH ELECTRONIC SHELF LABELS

(71) Applicant: WALMART APOLLO, LLC, Bentonville, AR (US)

(72) Inventors: Donald Ray High, Noel, MO (US); Martin Thomas Faitak, IV, Fayetteville, AR (US)

(73) Assignee: WALMART APOLLO, LLC, Bentonvillle, AR (US)

( * ) Notice: Subject to any disclaimer, the term of this patent is extended or adjusted under 35 U.S.C. 154(b) by 0 days.

(21) Appl. No.: 17/522,252

(22) Filed: Nov. 9, 2021

(65) Prior Publication Data

US 2022/0067653 A1   Mar. 3, 2022

Related U.S. Application Data

(63) Continuation of application No. 16/935,688, filed on Jul. 22, 2020, now abandoned.

(60) Provisional application No. 62/878,162, filed on Jul. 24, 2019.

(51) Int. Cl.
| | |
|---|---|
| *G06Q 10/08* | (2012.01) |
| *G06Q 10/0875* | (2023.01) |
| *B25J 9/16* | (2006.01) |
| *G09F 3/20* | (2006.01) |
| *H04W 4/35* | (2018.01) |
| *B25J 11/00* | (2006.01) |

(52) U.S. Cl.
CPC ........ *G06Q 10/0875* (2013.01); *B25J 9/1697* (2013.01); *B25J 11/008* (2013.01); *G09F 3/208* (2013.01); *H04W 4/35* (2018.02)

(58) Field of Classification Search
CPC ....... G06Q 10/875; B25J 9/1697; G09F 3/208
USPC ......................................................... 235/383
See application file for complete search history.

(56) References Cited

U.S. PATENT DOCUMENTS

| | | |
|---|---|---|
| 5,307,294 A | 4/1994 | Aman |
| 7,693,757 B2 | 4/2010 | Zimmerman |
| 10,963,658 B1 * | 3/2021 | Bloch .................. G06T 7/73 |
| 11,069,073 B2 | 7/2021 | Zhang |

(Continued)

OTHER PUBLICATIONS

BBK, Fully automatic systems. Retrieved online at: https://www.bbk-labelling.co.uk/products/labelling-systems/fully-automatic-systems. 18 pages, (2019).

(Continued)

*Primary Examiner* — Ahshik Kim (74) *Attorney, Agent, or Firm* — Fitch, Even, Tabin & Flannery LLP (57) ABSTRACT

Systems and methods that employ an autonomous robotic vehicle (ARV) alone or in combination with a remote computing device during the installation of electronic shelf labels (ESLs) in a facility are discussed. The ARV may detect pre-existing product information from paper labels located on modular units prior to their removal and then detect the location of electronic shelf labels (ESLs) after installation. Pre-existing product information gleaned from the paper labels is associated with the corresponding ESLs. The ARV may also determine compliance or non-compliance of modular units to which an ESL is affixed with a planogram of the facility.

19 Claims, 7 Drawing Sheets

(56) References Cited

U.S. PATENT DOCUMENTS

| | | | |
|---|---|---|---|
| 2012/0161932 A1* | 6/2012 | Byun | G06Q 30/02 |
| | | | 340/10.1 |
| 2017/0286773 A1 | 10/2017 | Skaff | |
| 2018/0005035 A1 | 1/2018 | Bogolea | |
| 2018/0257228 A1 | 9/2018 | Tingler | |
| 2020/0339354 A1 | 10/2020 | Soto Arriaza | |
| 2021/0312217 A1* | 10/2021 | Nater | G06T 7/246 |

OTHER PUBLICATIONS

Kaufman Engineered Systems, KES Robotic Load Labeler Utilizing FANUC Robotics. Retrieved online at: https://www.kaufmanengsys.com/automation-products/robotic-load-labeling. 7 pages, (2018).

Motion Controls Robotics, Robotic Roll Labeling. Retrieved online at: https://motioncontrolsrobotics.com/robotic-applications/robotic-roll-handling/robotic-roll-labeling/3 pages, (2019).

PanPac Engineering A/S, Fully automatic robotic label applicator from PanPac. Retrieved online at: https://www.youtube.com/watch?v=qz6gUSXxtfg. 4 pages, Apr. 29, 2015.

Walmart introduces self-driving, shelf-scanning robots in over 50 stores. Retrieved online at: https://www.designboom.com/technology/walmart-tests-shelf-scanning-isle-roaming-robots-Oct. 27, 2017. 9 pages, Oct. 27, 2017.

USPTO; U.S. Appl. No. 16/935,688; Notice of Allowance and Fee(s) Due dated Aug. 9, 2021.

* cited by examiner

SYSTEMS AND METHODS FOR AUTOMATED ASSOCIATION OF PRODUCT INFORMATION WITH ELECTRONIC SHELF LABELS

CROSS REFERENCE TO RELATED APPLICATIONS

This application is a continuation application of U.S. application Ser. No. 16/935,688, filed Jul. 22, 2020, which claims priority from U.S. Provisional Application No. 62/878,162, filed Jul. 24, 2019, the entire contents of the above applications being incorporated herein by reference in their entirety.

BACKGROUND

Electronic shelf labels (ESLs) are gaining greater acceptance in the retail environment. Unlike standard paper shelf labels, information displayed on ESLs can be automatically updated from a central control server.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are systems and methods for automated association of product information with electronic shelf labels. The systems and methods employ an autonomous robotic vehicle (ARV) alone or in combination with a remote computing device to detect pre-existing product information in the form of paper labels located on modular units. The ARV can then detect the location of electronic shelf labels (ESLs) after installation and can associate the pre-existing product information gleaned from the paper labels with the corresponding ESLs.

ESLs are an increasingly desirable way to display product information to purchasers at a retailer. Because information displayed on ESLs can be automatically updated from a central control server, or at least updated wirelessly from a local device, pricing or other information can be updated or corrected on a regular basis without requiring an entity (such as a retail employee) to physically walk to the shelf and replace the paper label with a new label containing updated information.

When a retailer opts to change from the existing paper labels to ESLs, the modular units that display products are conventionally modified to accommodate the ESLs. This is often done without removing the products from the modular unit. The process can involve removal of a portion of the modular unit that retains the paper labels, such as but not limited to shelf facings, and installation of a new portion that includes electronic shelf labels. Conventionally, after installation of the new portion including the ESLs, a person manually identifies each ESL one-by-one, consults the corresponding paper label (since removed from the modular unit) to determine the product information that should be associated with the ESL, and individually programs the ESL with the appropriate product information. This manual process utilizes a significant amount of labor to singly program each of the thousands of ESLs in a given retail facility. In addition, the manual process is repetitive and, thus, highly error-prone as it can be difficult to maintain correspondence between the ESLs and the removed paper labels over a work shift when each association must be made individually. Furthermore, errors are particularly difficult to detect for certain ESLs that display only price information for a product as the displayed price may not immediately indicate to the viewer that the association of the ESL with a product was made incorrectly.

Systems and methods are described herein to automate the process of conversion for a facility from paper shelf labels to electronic shelf labels. By using an autonomous robotic vehicle to obtain initial images of paper shelf labels before removal and subsequent images of electronic shelf labels after placement on the shelf, systems and methods described herein can re-program many multiple ESLs in a batch-processing fashion. As a result, the time and cost associated with initial manual programming of the ESLs and costs associated with correcting errors in the programming process are significantly reduced. Moreover, the process can be performed without human intervention, which enables the programming to be performed by the autonomous robotic vehicle and/or remote computing device while human labor resources are allocated elsewhere. Additionally, in some embodiments, the ARV can determine compliance or non-compliance of a modular unit with a planogram for the facility.

Figure 1:
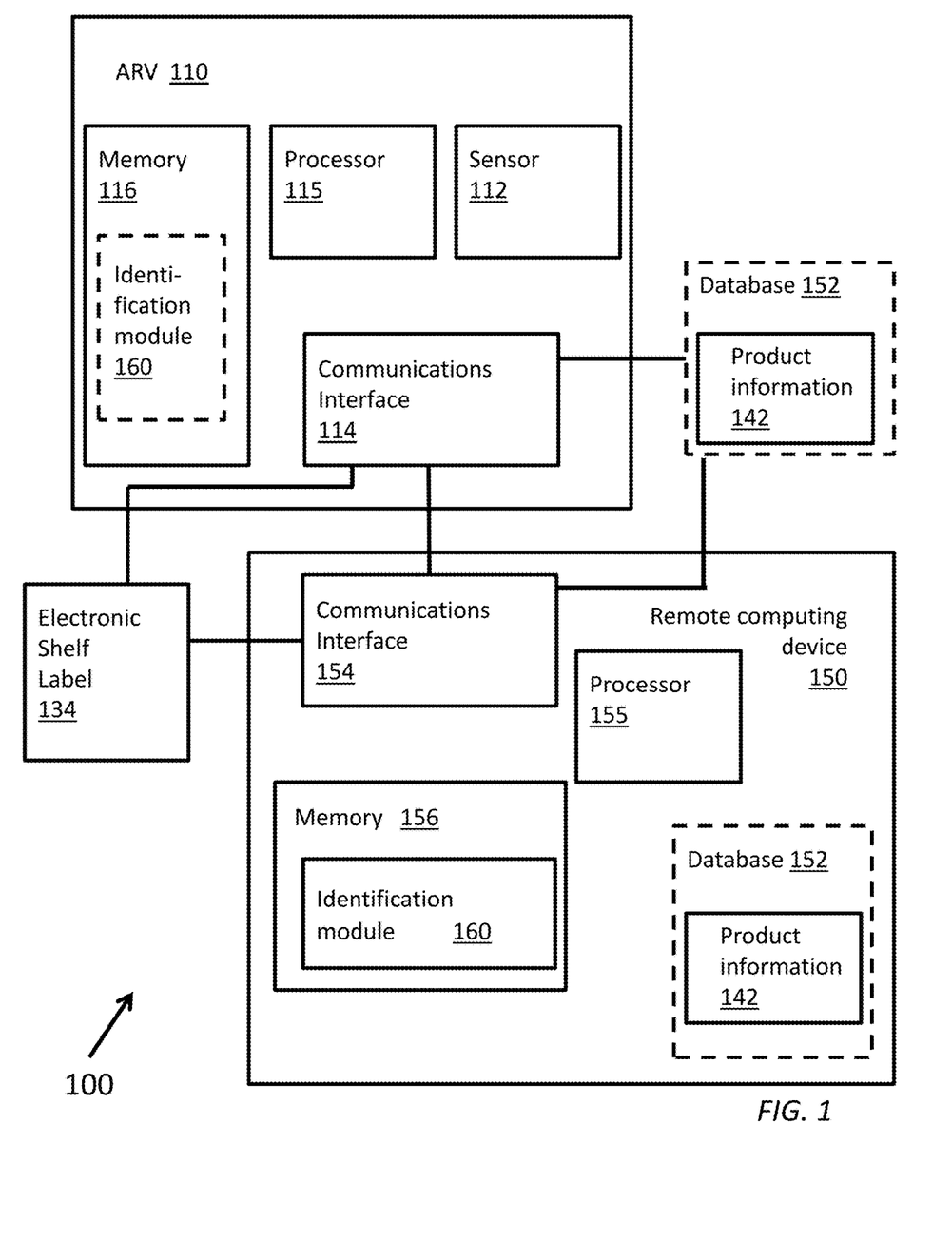
FIG. 1 illustrates a block diagram of an exemplary system for automated association of product information with electronic shelf labels in accordance with some embodiments described herein.

FIG. 1 illustrates a system 100 for automated association of product information with electronic shelf labels in accordance with an exemplary embodiment. The system 100 includes an autonomous robotic vehicle (ARV) 110 and a remote computing device 150. The ARV 110 includes a memory 116, a processor 115, at least one sensor 112, and a communications interface 114. The sensor 112, may be, but is not limited to, a camera or video camera capable of obtaining still or moving images. Optionally, the memory 116 of the ARV 110 can store an identification module 160 that can be executed by the processor 115. In one embodiment, the ARV is a ground-based autonomous vehicle. In another embodiment, the ARV may be an Unmanned Aerial Vehicle (UAV) capable of flight. The remote computing device 150 includes a processor 155, a communications interface 154, and a memory 156 that may store the identification module 160 that can be executed by the processor 155. The remote computing device 150 and/or the ARV 110 can be in communication with one or more databases 152 that include product information 142 related to products stored on the modular units. In some embodiments, the database 152 including product information 142 is implemented within the remote computing device 150. In some embodiments, the remote computing device 150 and/or the ARV 110 can be in communication with one or more ESLs 134 disposed on a modular unit.

Continuing with the description of FIG. 1, the ARV 110 may execute instructions causing it to obtain one or more initial images of one or more modular units in a facility in which paper shelf labels on the modular units appear. The ARV 110 is configured to transmit the initial images to the remote computing device 150 using the communications interface 114. The ARV 110 may also execute instructions causing it to obtain one or more subsequent images of the same modular units in which electronic shelf labels 134 appear. The ARV 110 is configured to transmit the subsequent images to the remote computing device 150 using the communications interface 114. The remote computing device 150 receives the initial and subsequent images via the communications interface 154. The remote computing device 150 also executes the identification module 160 to determine the product information 142 associated with paper shelf labels 132 in the initial images and to determine identifying information for the electronic shelf labels 134 in the subsequent images. The execution of the identification module 160 determines the correspondence between the paper shelf labels 132 in the initial images and the ESLs 134 in the subsequent images and associates the proper product information 142 with the ESLs 134. Once informed of the association, the ARV 110 or remote computing device 150 can program the ESL 134 to display the correct product information 142. By automating identification and association between paper shelf labels and ESLs, the system 100 reduces human involvement in the process of preparing and programming the replacement ESLs upon removal of paper shelf labels on modular units and reduces rates of error in programming of the ESLs.

Figure 2A:
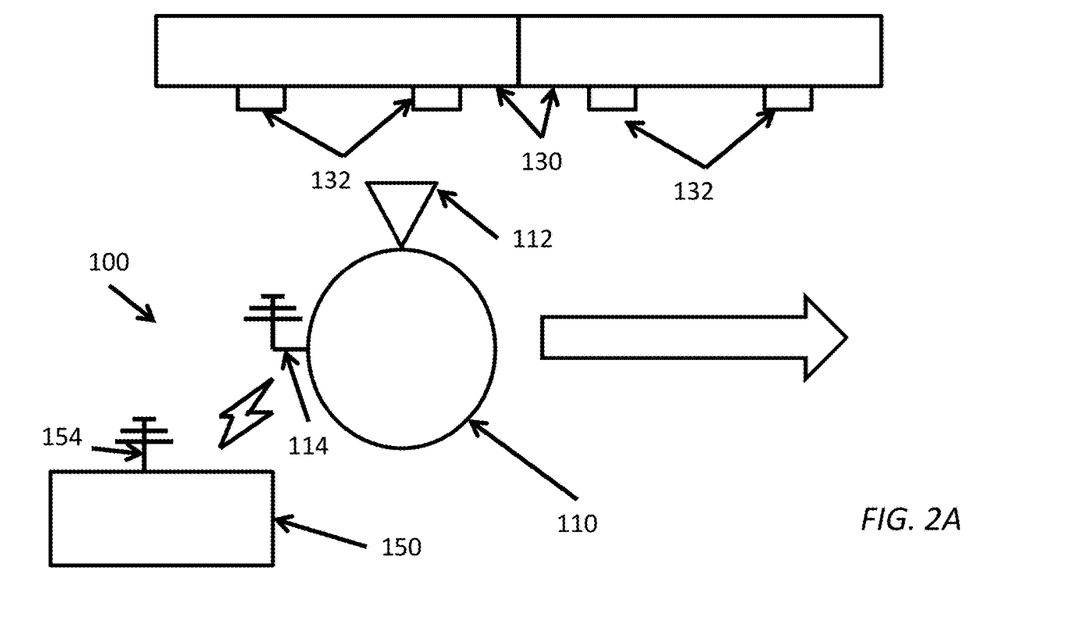
FIG. 2A illustrates an overhead view of an exemplary embodiment that obtains images of paper shelf labels on modular units.
Figure 2B:
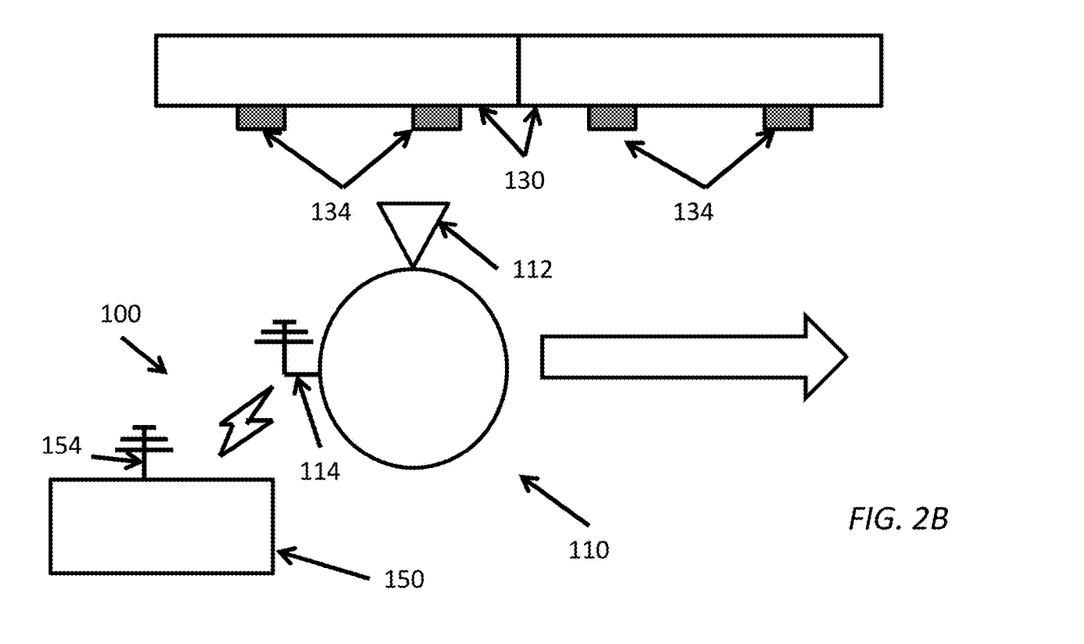
FIG. 2B illustrates an overhead view of the exemplary embodiment of FIG. 2A obtaining images of electronic shelf labels on modular units.

As shown in FIGS. 2A and 2B, the ARV 110 can move in relation to the modular units 130 in the facility. In some embodiments, the ARV 110 can include wheels or treads to enable motion laterally with respect to the modular units 130 or to enable motion closer to or further from the modular units 130. In other embodiments, the ARV may hover in proximity of modular units containing paper labels or ESLs in a position enabling the ARV to obtain images. As the ARV 110 moves in relation to the modular units 130, the sensor 112 can obtain initial images of the modular units 130 and associated paper labels 132 as shown schematically in FIG. 2A. Each of the paper labels 132 can correspond to a product stored on the modular unit 130. In some embodiments, the images are sent from the ARV 110 to the remote computing device 150. For example, the ARV 110 may communicate with remote computing device 150 via communications interface 114 of the ARV 110 and communications interface 154 of the remote computing device 150. In some embodiments, the communication may be performed using a wired or wireless communication standard including, but not limited to, 802.11x, BlueTooth®, Wi-Max, or any other suitable communications standard. As described below in greater detail, the initial images can be retained for further analysis at the ARV 110 in embodiments without a remote computing device 150. Movement of the ARV 110 and acquisition of images can be controlled by the processor 114 executing instructions on-board the ARV 110 in some embodiments.

After the image acquisition described above in relation to FIG. 2A, the modular units 130 can be prepared for conversion to electronic shelf labels. For example, the modular units 130 can include a removable edge/shelf facing portion including the labels at the front of each shelf. The original removable edge portion including paper labels 132 can be removed and replaced with a new removable edge portion including ESLs 134. In some embodiments, the new removable edge portion can include a same number of ESLs 134 as the number of paper labels 132 on the original removable edge portion. In addition, each ESL 134 can be in a same position with respect to the removable edge portion as a position of the corresponding paper label 132 on the original removable edge portion.

After installation of the ESLs 134 on the modular units 130, the ARV 110 can move relative to the modular units 130 and acquire subsequent images of the modular units 130 (subsequent to the addition of the ESLs) and associated ESLs 134 as shown schematically in FIG. 2B.

Figure 3A:
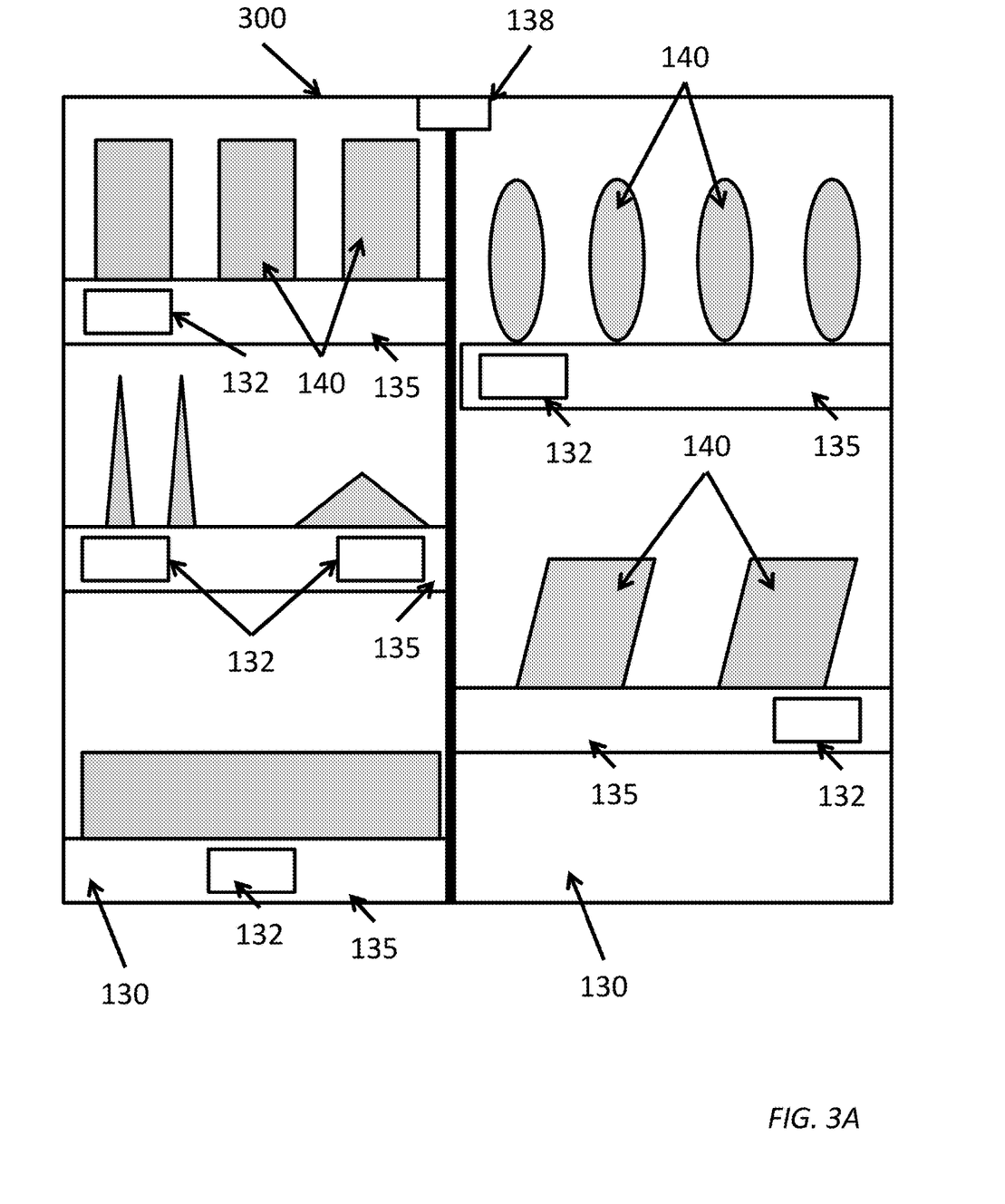
FIG. 3A illustrates an image of paper labels obtained in an exemplary embodiment.

FIG. 3A depicts a portion of an image 300 obtained by the ARV 110 during the image acquisition process depicted in FIG. 2A. In the image 300, the modular unit 130, paper labels 132, and products 140 situated on shelves 135 of the modular unit 130 can appear. In some embodiments, a modular unit identifier 138 associated with the modular unit 130 can appear in the image 300. Although only a single image 300 is illustrated herein, it should be appreciated that the ARV 110 may obtain multiple images of the modular units 130 as the ARV 110 moves relative to the modular units 130 in exemplary embodiments. In some embodiments, the multiple images can include overlapping image content to enable stitching of the separate images or a similar method to identify the same objects in separate images.

The image 300 can be analyzed by the identification module 160 performing video analytics to identify the paper shelf labels 132 appearing in the image 300. In some embodiments, the sensor 112 of the ARV 110 can acquire images of sufficiently high resolution that subsequent analysis can resolve information appearing on the paper shelf labels 132 from several feet away. For example, the sensor 112 can include optics and/or detection elements (such as charge coupled devices or CCDs) capable of producing an image including legible paper shelf labels 132 with 8-10 point font from five feet away. In some embodiments, the paper shelf labels 132 can include information associated with one or more products 140. For example, the paper shelf labels 132 can include a Universal Product Code (UPC), price information for the product, product serial numbers or other identification numbers, or a two-dimensional machine-translatable code such as a barcode or a QR Code® that identifies the product.

In some embodiments, the identification module 160 is stored in the memory 156 of the remote computing device 150, and the initial images 300 are transmitted from the ARV 110 to the remote computing device 150 for analysis. In some embodiments, the identification module 160 is stored in the memory 116 of the ARV 110, and the initial image 300 is analyzed locally in the ARV 110.

In some embodiments, the memory 116 of the ARV 110 or the memory 156 of the remote computing device 150 can include one or more label templates. The one or more label templates can include information, for example, as to the location of a barcode or other information within the borders of the paper label 132. As part of the image analysis and information extraction performed by the identification module 160, portions of the initial image 300 including images of paper shelf labels 132 can be compared to the one or more label templates to improve accuracy in isolation and/or determination of information appearing on the paper shelf labels 132.

In some embodiments, the identification module 160 can compare information obtained from the paper shelf labels 132 to product information 142 retrieved from the one or more databases 152. The comparison ensures that the information was obtained without error from the product shelf labels 132. Additionally, the comparison enables the identification module 160 to determine which product information 142 stored in the one or more databases is associated with each of the paper shelf labels 132.

The identification module 160 can assess the location of the paper shelf labels 132 with respect to the modular units 130, with respect to one or more products 140 on the shelves 135, or with respect to both. The identification module 160 can identify the paper shelf labels 132 and associate the paper shelf label 132 with the nearest product 140 in some embodiments. In some embodiments, the identification module 160 can associate a location of each paper shelf label 132 on the modular unit 130 with the corresponding product information 142 in the database.

After the ARV 110 acquires initial images (of which image 300 is an example), the paper shelf labels 132 are removed from the modular units 130. Then, ESLs 134 are affixed to the modular units 130 and subsequent images are acquired as described next.

Figure 3B:
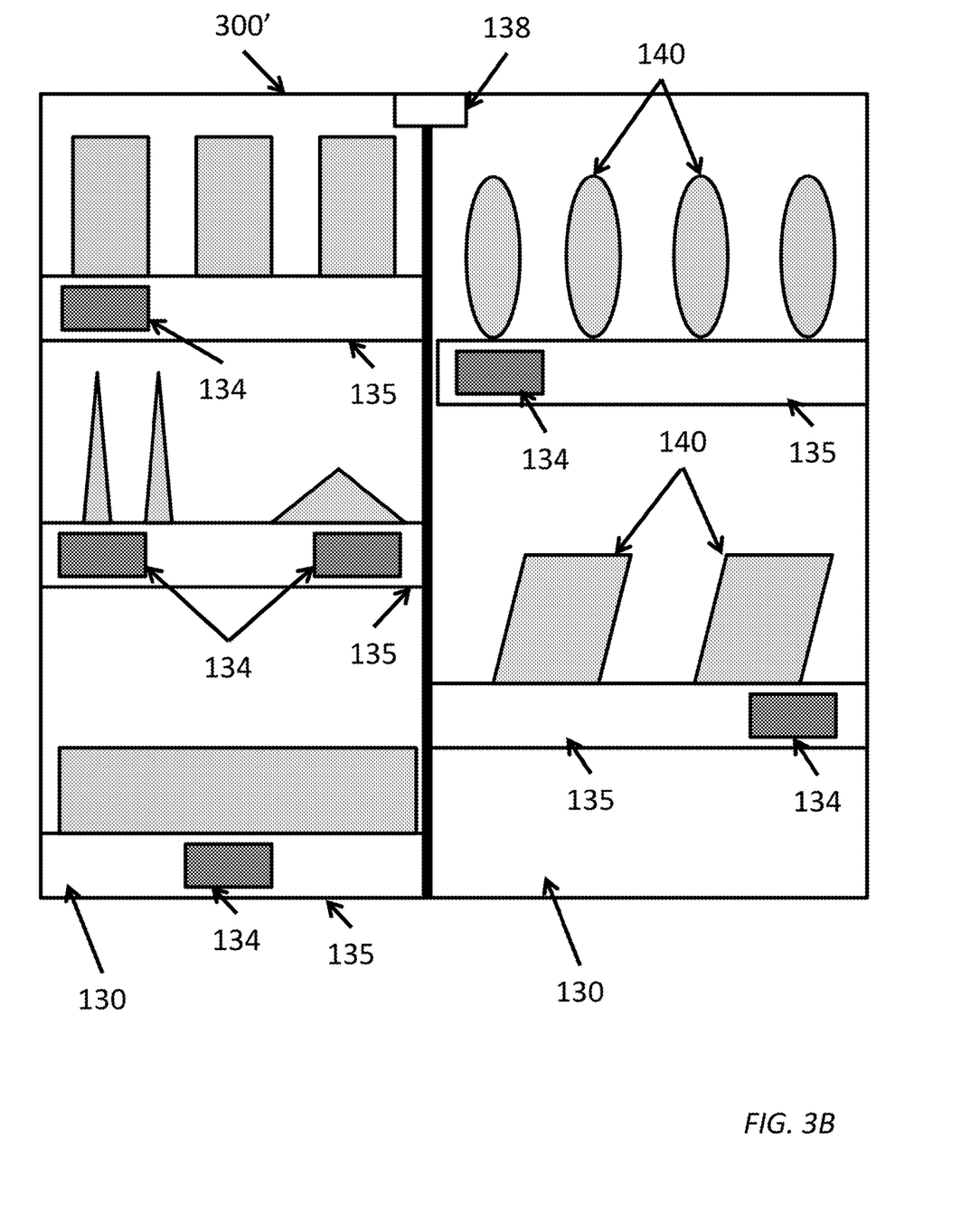
FIG. 3B illustrates an image of electronic shelf labels obtained in an exemplary embodiment.

FIG. 3B illustrates a portion of an example image 300' obtained by the ARV 110 during the image acquisition process depicted in FIG. 2B after ESLs 134 have been affixed to the modular units 130. In the image 300', the modular units 130, ESLs 134, and products 140 situated on shelves 135 of the modular unit 130 can appear. In some embodiments, the modular unit identifier 138 associated with the modular unit 130 can appear in the image 300'. In some embodiments, the ESLs 134 can include identifying information. For example, the paper shelf labels 132 can include a serial number or other individualized number or a two-dimensional machine-translatable code such as a barcode or a QR Code® that identifies the ESL 134. As described above with respect to FIG. 3A, the sensor 112 can produce images 300' of sufficient quality as to enable the resolution and/or analysis of identifying information displayed on the ESL 134.

In some embodiments, the identification module 160 is stored in the memory 156 of the remote computing device 150, and the subsequent image 300' is transmitted from the ARV 110 to the remote computing device 150 for analysis. In some embodiments, the identification module 160 is stored in the memory 116 of the ARV 110, and the subsequent image 300' is analyzed locally in the ARV 110.

The identification module 160 can assess the location of the ESLs 134 with respect to the modular units 130, with respect to one or more products 140 on the shelves 135, or with respect to both. The identification module 160 can identify the ESLs 134 and associate the ESLs 134 with the nearest product 140 in some embodiments.

The identification module 160 identifies a correspondence between each of the ESLs 134 in the subsequent image 300' and one of the paper shelf labels 132 in the initial image 300. The correspondence can be identified based upon the locations of the paper shelf label 132 and the ESL 134 relative to the modular unit 130, relative to products 140 on shelves 135, or both. When a paper shelf label 132 is identified as being at a particular location in image 300 and an ESL 134 is identified as being at the same location in image 300', the paper shelf label 132 and the ESL 134 correspond.

The identification module 160 associates product information 142 previously assigned to each of the paper shelf labels 132 to the corresponding ESL 134. In this way, each ESL 134 affixed on the modular unit 130 is properly associated with the product nearest to it on the shelf 135. In some embodiments, the identification module 160 can transmit instructions to the ARV 110 to program the ESL 134 with the associated product information 142. Alternatively, if the remote computing device 150 is able to communicate directly or indirectly with the ESL, the remote computing device can program each ESL 134 with product information 142 by transmitting instructions to do so via the communications interface 154. In some embodiments, the ESL 134 can display the product information 142 such as, but not limited to, price information.

In some embodiments, the identification module 160 performs video analytics and identifies and analyzes the modular unit identifier 138 disposed on the modular unit 130 and appearing in the initial images 300, the subsequent images 300', or both. The modular unit identifier 138 can include information specific to each modular unit 130 such as a serial number or two-dimensional machine-translatable code. In some embodiments, the modular unit identifier 138 can include information related to the position of the modular unit 130 within the facility such as a number or graphic keyed to a planogram of the facility. The identification module 160 can identify a location of the modular unit 130 within the facility based on the analysis of the modular unit identifier 138 with respect to stored facility location information. In some embodiments, the analysis of the modular unit identifier 138 includes an analysis of the planogram of the facility. Once the location of the modular unit 130 within the facility has been identified, the location can be associated with the identifying information of a corresponding ESL 134 that is affixed to that modular unit 130. Identification of the location of an ESL 134 (on a modular unit 130) within the facility provides the advantage that the ESL 134 can be programmed with product information 142 that is tailored to the location of the associated product within the facility. For example, the facility may have two customer zones in which a product is sold at different prices. The first zone may be the general merchandise section of the facility while the second zone may be a special "convenience" section, a limited-availability sale section (e.g., a section including "doorbuster" products in limited quantities or for limited times), or a specialized section such as a home and garden section. Thus, an ESL 134 for the same product may display different product information 142 depending upon the location of the ESL 134 within the facility. The identification module 160 can program the ESL 134 with product information 142 that takes into account not only the identifying information of the ESL 134 but also associated location information.

In some embodiments, the ARV 110 stores a planogram of the facility in memory and can check the accuracy of the planogram of the facility after image acquisition. For example, the ARV 110 can confirm that one or more ESLs 134 (e.g., the location or identity of the ESLs 134) corresponds to the planogram of the facility and transmits a notification to the remote computing device 150. Alternatively or in addition, the ARV 110 can confirm that one or more ESLs 134 fail to correspond to the planogram of the facility and can transmit a notification to the remote computing device 150. The notification can include the identifying information for the one or more ESLs 134. Upon receipt of the notification that the ESL fails to correspond to the planogram, the remote computing device 150 can issue an alert. In one embodiment, the alert may be transmitted to a store associate that can then remedy the discrepancy if necessary. In another embodiment, the alert may be transmitted to the same or different ARV capable of performing an action to remedy the planogram issue. For example, if the ARV is equipped with an articulating arm capable of placing and removing items, the ARV may be tasked by the remote computing device with adding or removing items to or from the modular unit until the modular unit corresponds with the planogram.

Figure 4:
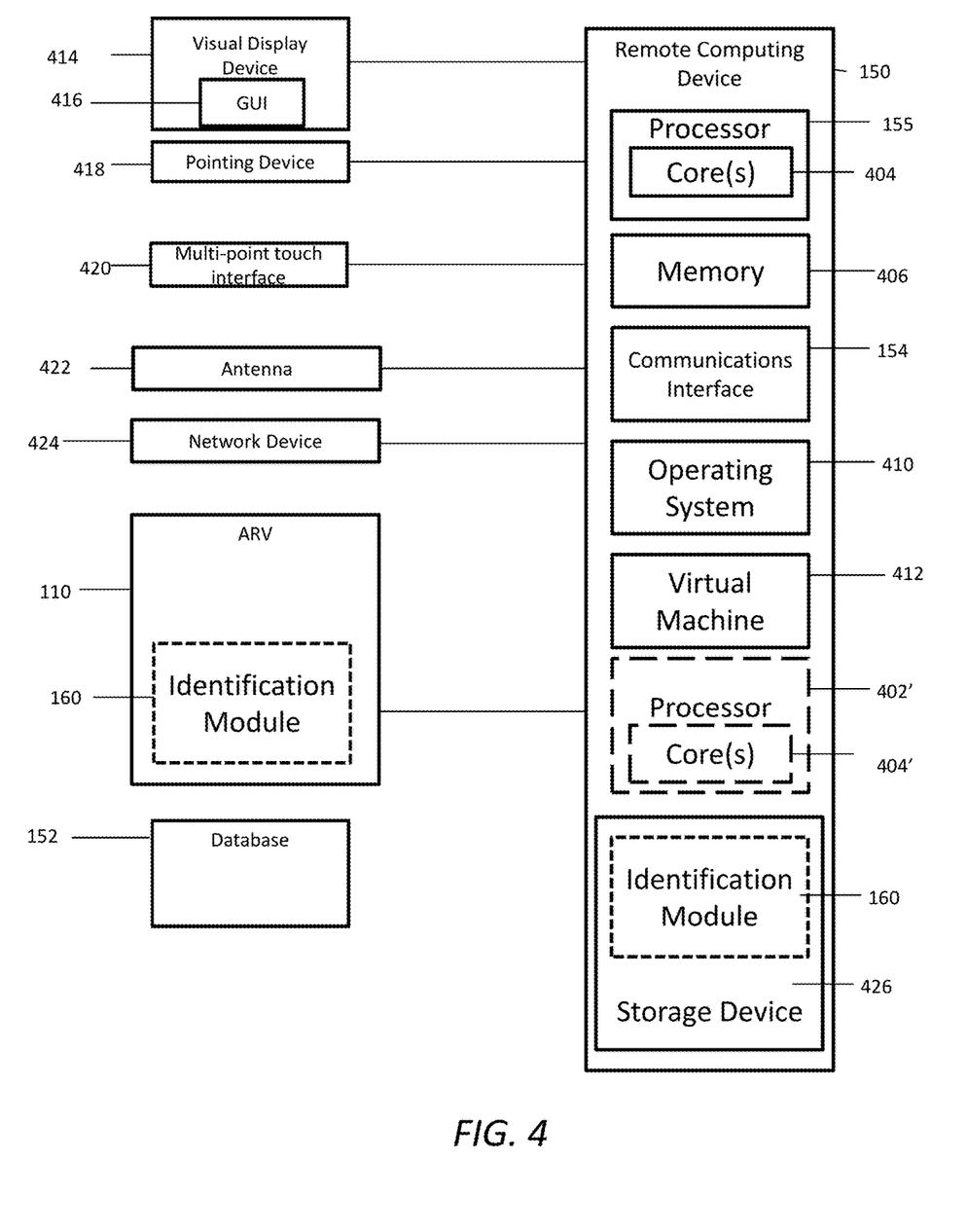
FIG. 4 illustrates a block diagram of a remote computing device suitable for use with exemplary embodiments.

FIG. 4 is a block diagram of a remote computing device 150 suitable for use with exemplary embodiments of the present disclosure. The remote computing device 150 may be, but is not limited to, a smartphone, laptop, tablet, desktop computer, server, or network appliance. The remote computing device 150 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 156 included in the remote computing device 150 may store computer-readable and computer-executable instructions or software (e.g., identification module 160 for implementing exemplary operations of the remote computing device 150 such as identification module 160. The remote computing device 150 also includes configurable and/or programmable processor 155 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 156 and other programs for implementing exemplary embodiments of the present disclosure. Processor 155 and processor(s) 402' may each be a single core processor or multiple core (404 and 404') processor. Either or both of processor 155 and processor(s) 402' may be configured to execute one or more of the instructions described in connection with remote computing device 150.

Virtualization may be employed in the remote computing device 150 so that infrastructure and resources in the remote computing device 150 may be shared dynamically. A virtual machine 412 may be provided to handle a process running on multiple processors so that the process appears to be using only one computing resource rather than multiple computing resources. Multiple virtual machines may also be used with one processor.

Memory 156 may include a computer system memory or random access memory, such as DRAM, SRAM, EDO RAM, and the like. Memory 156 may include other types of memory as well, or combinations thereof.

A user may interact with the remote computing device 150 through a visual display device 152, such as a computer monitor, which may display one or more graphical user interfaces 416. The user may interact with the remote computing device 150 using a multi-point touch interface 420 or a pointing device 418.

The remote computing device 150 may also include one or more computer storage devices 426, such as a hard-drive, CD-ROM, or other computer readable media, for storing data and computer-readable instructions and/or software that implement exemplary embodiments of the present disclosure (e.g., applications). For example, exemplary storage device 426 can include one or more databases 152 for storing product information 142, location information for paper shelf labels 132 or ESLs 134, planograms of the facility, or identifying information related to ESLs 134. The databases 152 may be updated manually or automatically at any suitable time to add, delete, and/or update one or more data items in the databases.

The remote computing device 150 can include a communications interface 154 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the remote computing device 150 can include one or more antennas 422 to facilitate wireless communication (e.g., via the network interface) between the remote computing device 150 and a network and/or between the remote computing device 150 and the ARV 110. The communications interface 154 may include a built-in network adapter, network interface card, PCMCIA network card, card bus network adapter, wireless network adapter, USB network adapter, modem or any other device suitable for interfacing the remote computing device 150 to any type of network capable of communication and performing the operations described herein.

The remote computing device 150 may run operating system 410, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating system capable of running on the remote computing device 150 and performing the operations described herein. In exemplary embodiments, the operating system 410 may be run in native mode or emulated mode. In an exemplary embodiment, the operating system 410 may be run on one or more cloud machine instances.

Figure 5:
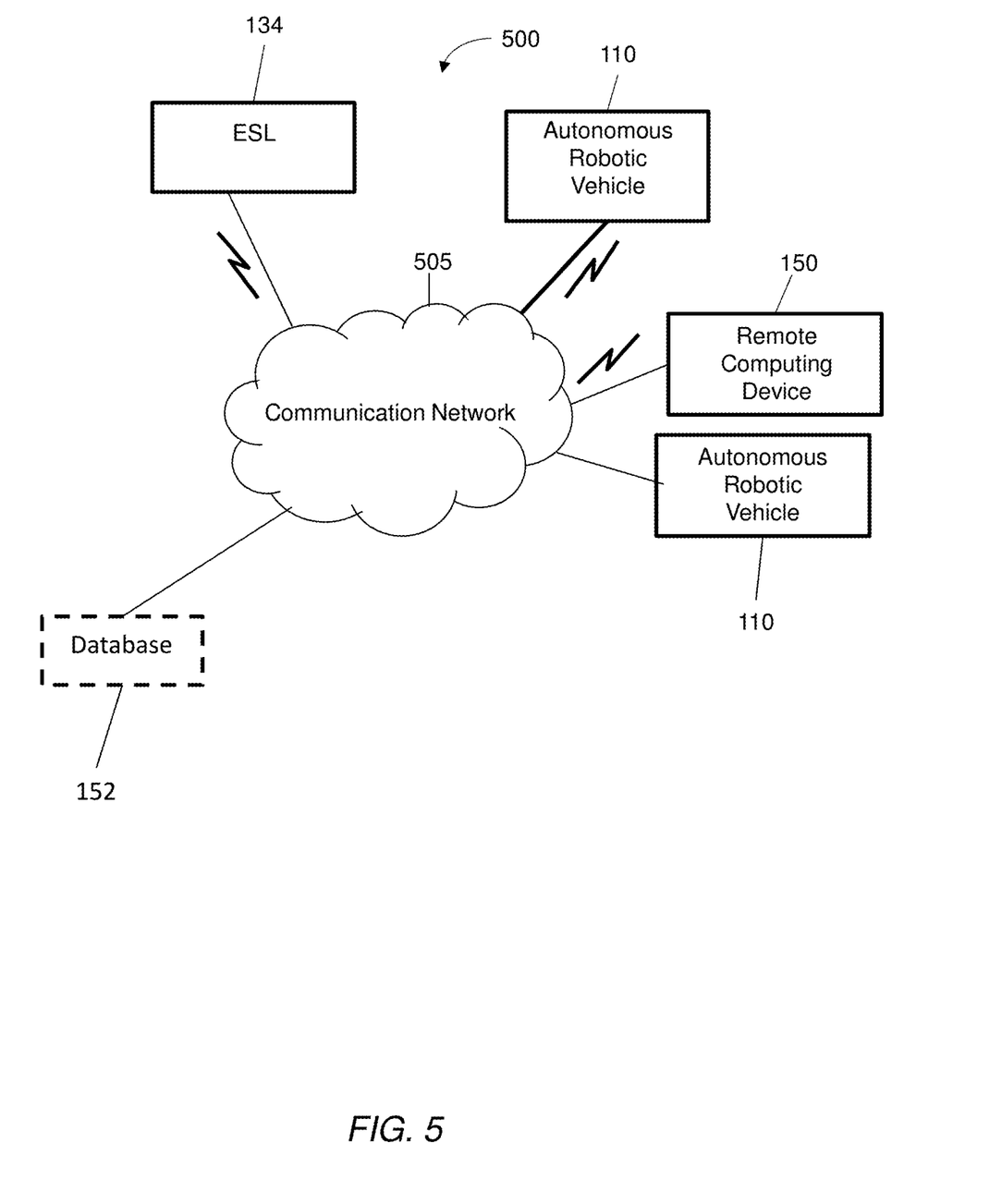
FIG. 5 illustrates a network environment suitable for use with exemplary embodiments.

FIG. 5 illustrates a network environment 500 including the ARV 110 and remote computing system 150 suitable for use with exemplary embodiments. The network environment 500 can include one or more databases 152, one or more ARVs 110, one or more ESLs 134, and one or more remote computing devices 150 that can communicate with one another via a communications network 505.

The remote computing device 150 can host one or more applications (e.g., the identification module 160) configured to interact with one or more components of the ARVs 110 and/or to facilitate access to the content of the databases 152. The databases 152 may store information or data as described above herein. For example, the databases 152 can include product information 142, identifying information for one or more ESLs 134, one or more planograms for the facility, and location information associated with paper shelf labels 132 and/or ESLs 134. The databases 152 can be located at one or more geographically distributed locations away from the ARVs 110 and/or the remote computing device 150. Alternatively, the databases 152 can be located at the same geographical location as the remote computing device 150 and/or at the same geographical location as the ARVs 110.

In an example embodiment, one or more portions of the communications network 505 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a WiMAX network, an Internet-of-Things (IoT) network established using BlueTooth® or any other protocol, any other type of network, or a combination of two or more such networks.

Figure 6:
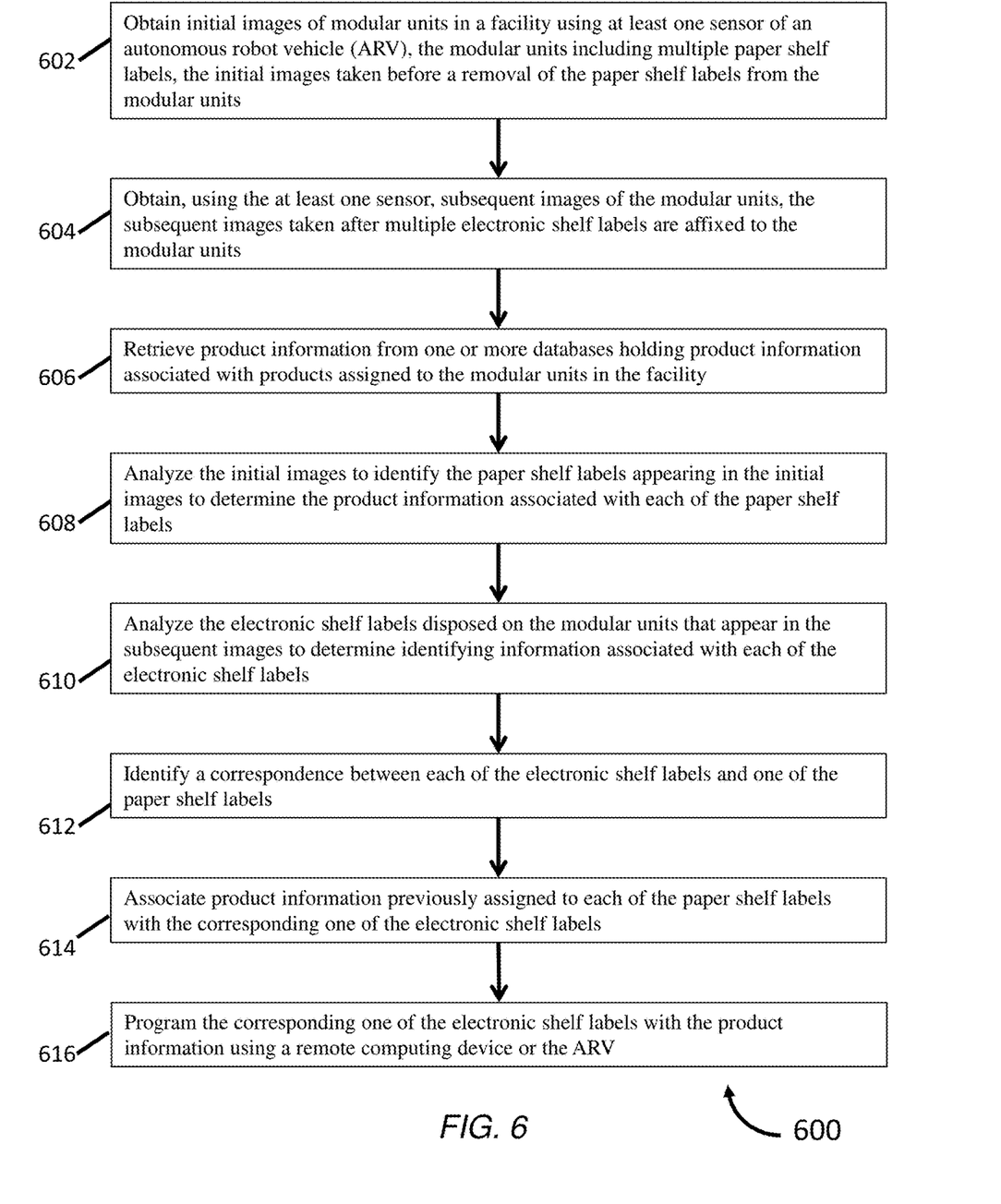
FIG. 6 illustrates a flowchart for a method for automated association of product information with electronic shelf labels in an exemplary embodiment.

FIG. 6 illustrates a flowchart for a method 600 for automated association of product information with electronic shelf labels in an exemplary embodiment. The method 600 includes obtaining initial images 300 of modular units 130 in a facility using at least one sensor 112 of an autonomous robot vehicle (ARV) 110 (step 602). The modular units 130 include multiple paper shelf labels 132. The initial images 300 are taken before removal of the paper shelf labels 132 from the modular units 130. The method 600 further includes obtaining, using the at least one sensor 112, subsequent images 300' of the modular units 130 (step 604). The subsequent images 300' are taken after multiple electronic shelf labels 134 are affixed to the modular units 130.

The method 600 also includes retrieving product information 142 from one or more databases 152 holding product information 142 associated with products 140 assigned to the modular units 130 in the facility (step 606). The method 600 additionally includes analyzing the initial images 300 to identify the paper shelf labels 132 appearing in the initial images 300 to determine the product information 142 associated with each of the paper shelf labels 132 (step 608). The method 600 includes analyzing the electronic shelf labels 134 disposed on the modular units 130 that appear in the subsequent images 300' to determine identifying information associated with each of the electronic shelf labels 134 (step 610).

Additionally, the method 600 includes identifying a correspondence between each of the electronic shelf labels 134 and one of the paper shelf labels 132 (step 612). The method 600 also includes associating product information 142 previously assigned to each of the paper shelf labels 133 with the corresponding one of the electronic shelf labels 134 (step 614). Following the association of paper shelf label to ESL, the corresponding one of the electronic shelf labels is programmed with the product information by the remote computing device or the ARV (step 616).

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component, or step. Likewise, a single element, component, or step may be replaced with multiple elements, components, or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for automated association of product information with electronic shelf labels, comprising:
   a remote computing device that includes a processor, a memory, and a communications interface, the remote computing device configured to execute an identification module;
   one or more databases holding product information associated with products assigned to a plurality of modular units in a facility; and
   a local computing device located in the facility and that includes at least one sensor, a communications interface, a processor, and a memory;
   wherein the identification module when executed is configured to:
      receive, from the local computing device, a plurality of initial images of a plurality of modular units in the facility, the plurality of modular units including a plurality of paper shelf labels, the plurality of initial images taken before a removal of the plurality of paper shelf labels from the plurality of modular units;
      receive, from the local computing device, a plurality of subsequent images of the plurality of modular units, the plurality of subsequent images taken after a plurality of electronic shelf labels are affixed to the plurality of modular units;
      retrieve product information from the one or more databases;
      analyze the plurality of initial images to identify the plurality of paper shelf labels appearing in the plurality of initial images to determine the product information associated with each of the plurality of paper shelf labels;
      analyze the plurality of electronic shelf labels disposed on the modular unit that appear in the plurality of subsequent images to determine identifying information associated with each of the plurality of electronic shelf labels;
      identify a correspondence between each of the plurality of electronic shelf labels and one of the plurality of paper shelf labels; and
      associate product information previously assigned to each of the plurality of paper shelf labels with the corresponding one of the plurality of electronic shelf labels, wherein the corresponding one of the plurality of electronic shelf labels is programmed with the product information.

2. The system of claim 1, wherein the identification module when executed:
   transmits instructions to the local computing device to program the plurality of electronic shelf labels with the associated product information.

3. The system of claim 1, wherein the identification module when executed:
   analyzes a modular unit identifier disposed on the modular unit and appearing in the plurality of initial images;
   identifies a location of the modular unit within the facility based on the analysis of the modular unit identifier and a planogram of the facility; and
   associates the location with the identifying information of a corresponding one of the plurality of electronic shelf labels.

4. The system of claim 1, wherein the local computing device stores a planogram of the facility and uses the planogram to confirm that one of the plurality of electronic shelf labels corresponds to a planogram of the facility and transmits a notification to the remote computing device.

5. The system of claim 1, wherein the local computing device stores a planogram of the facility and uses the planogram to confirm that one of the plurality of electronic shelf labels fails to correspond to a planogram of the facility and transmits a notification to the remote computing device.

6. The system of claim 1, wherein the local computing device is an autonomous robotic vehicle or forms a part thereof.

7. A system for automated association of product information with electronic shelf labels, comprising:
one or more databases holding product information associated with products assigned to a plurality of modular units in a facility; and
a local computing device in the facility and that includes at least one sensor, an identification module, a processor, and a memory;
wherein the identification module when executed is configured to:
receive, from the local computing device, a plurality of initial images of a plurality of modular units in the facility, the plurality of modular units including a plurality of paper shelf labels, the plurality of initial images taken before a removal of the plurality of paper shelf labels from the plurality of modular units;
receive, from the local computing device, a plurality of subsequent images of the plurality of modular units, the plurality of subsequent images taken after a plurality of electronic shelf labels are affixed to the plurality of modular units;
retrieve product information from the one or more databases;
analyze the plurality of initial images to identify the plurality of paper shelf labels appearing in the plurality of initial images to determine the product information associated with each of the plurality of paper shelf labels;
analyze the plurality of electronic shelf labels disposed on the modular unit that appear in the plurality of subsequent images to determine identifying information associated with each of the plurality of electronic shelf labels;
identify a correspondence between each of the plurality of electronic shelf labels and one of the plurality of paper shelf labels; and
associate product information previously assigned to each of the plurality of paper shelf labels with the corresponding one of the plurality of electronic shelf labels, wherein the corresponding one of the plurality of electronic shelf labels is programmed with the product information.

8. The system of claim 7, wherein the local computing device includes a communications interface and the identification module when executed:
programs the plurality of electronic shelf labels with the associated product information using the communications interface.

9. The system of claim 7, wherein the identification module when executed:
analyzes a modular unit identifier disposed on the modular unit and appearing in the plurality of initial images;
identifies a location of the modular unit within the facility based on the analysis of the modular unit identifier and a planogram of the facility; and
associates the location with the identifying information of a corresponding one of the plurality of electronic shelf labels.

10. The system of claim 7, wherein the local computing device stores a planogram of the facility and uses the planogram to confirm that one of the plurality of electronic shelf labels corresponds to a planogram of the facility and transmits a notification to a remote computing device.

11. The system of claim 7, wherein the local computing device stores a planogram of the facility and uses the planogram to confirm that one of the plurality of electronic shelf labels fails to correspond to a planogram of the facility and transmits a notification to a remote computing device.

12. The system of claim 7 wherein the local computing device includes the one or more databases.

13. The system of claim 7 wherein the one or more databases include one or more communications interfaces and the local computing device includes a communications interface, and wherein the identification module retrieves product information from the one or more databases by using the communications interface of the local computing device to receive product information from the one or more communications interfaces of the one or more databases.

14. A method for automated association of product information with electronic shelf labels, comprising:
receiving, from a local computing device located in a facility, a plurality of initial images of a plurality of modular units in the facility, the plurality of modular units including a plurality of paper shelf labels, the plurality of initial images taken before a removal of the plurality of paper shelf labels from the plurality of modular units;
receiving, from the local computing device, a plurality of subsequent images of the plurality of modular units, the plurality of subsequent images taken after a plurality of electronic shelf labels are affixed to the plurality of modular units;
retrieving product information from one or more databases holding product information associated with products assigned to the plurality of modular units in the facility,
analyzing the plurality of initial images to identify the plurality of paper shelf labels appearing in the plurality of initial images to determine the product information associated with each of the plurality of paper shelf labels,
analyzing the plurality of electronic shelf labels disposed on the plurality of modular units that appear in the plurality of subsequent images to determine identifying information associated with each of the plurality of electronic shelf labels,
identifying a correspondence between each of the plurality of electronic shelf labels and one of the plurality of paper shelf labels, and
associating product information previously assigned to each of the plurality of paper shelf labels with the corresponding one of the plurality of electronic shelf labels; and
programming the corresponding one of the plurality of electronic shelf labels with the product information.

15. The method of claim 14, further comprising:
programming the plurality of electronic shelf labels with the associated product information using the local computing device.

16. The method of claim 14, further comprising:
- analyzing a modular unit identifier disposed on a modular unit in the plurality of modular units and appearing in the plurality of initial images;
- identifying a location of the modular unit within the facility based on the analysis of the modular unit identifier and a planogram of the facility; and
- associating the location with the identifying information of a corresponding one of the plurality of electronic shelf labels.

17. The method of claim 14, wherein the local computing device stores a planogram of the facility and further comprising:
- determining using the stored planogram whether one of the plurality of electronic shelf labels corresponds to a planogram of the facility; and
- upon a determination of correspondence, transmitting a notification from the local computing device to a remote computing device.

18. The method of claim 14, wherein the local computing device stores a planogram of the facility and further comprising:
- determining using the stored planogram whether one of the plurality of electronic shelf labels fails to correspond to a planogram of the facility; and
- upon a determination of failure to correspond, transmitting a notification from the local computing device to a remote computing device.

19. The method of claim 14, further comprising:
- transmitting the plurality of subsequent images to the remote computing device; and
- transmitting the plurality of initial images to a remote computing device using a communications interface of the local computing device, and
- wherein analyzing the plurality of initial images and analyzing the plurality of electronic shelf labels disposed on the modular units that appear in the plurality of subsequent images is performed by the remote computing device.

* * * * *